United States Patent [19]

Nagatani et al.

[11] Patent Number: 5,454,001
[45] Date of Patent: Sep. 26, 1995

[54] DATA TRANSMISSION SYSTEM FOR AUTOMOTIVE VEHICLES

[75] Inventors: Yuji Nagatani; Jun Ishii; Hiroshi Hashimoto, all of Wako, Japan

[73] Assignee: Honda Giken Kogyo Kabushiki Kaisha, Tokyo, Japan

[21] Appl. No.: 213,223

[22] Filed: Mar. 14, 1994

[30] Foreign Application Priority Data

Apr. 16, 1993 [JP] Japan ..................................... 5-113681
Apr. 21, 1993 [JP] Japan ..................................... 5-117914

[51] Int. Cl.$^6$ ................................................. G06F 11/00
[52] U.S. Cl. ........................................ 371/68.2; 371/20.1
[58] Field of Search ................................. 371/68.2, 67.1, 371/68.1, 29.5, 48, 20.1

[56] References Cited

U.S. PATENT DOCUMENTS

| | | | |
|---|---|---|---|
| 4,070,648 | 1/1978 | Mergenthaler et al. | ............. 340/146.1 |
| 4,455,644 | 6/1994 | Fox et al. | ..................................... 370/13 |
| 5,315,597 | 5/1994 | Yang et al. | ............................. 371/20.1 |

*Primary Examiner*—Robert W. Beausoliel, Jr.
*Assistant Examiner*—Norman M. Wright
*Attorney, Agent, or Firm*—Frishauf, Holtz, Goodman, Langer & Chick

[57] ABSTRACT

A data transmission system for an automotive vehicle includes a plurality of control units installed on the vehicle, and a transmission line connecting the plurality of control units with each other. The transmission line comprises a pair of signal lines to which digital data signals having opposite polarities are delivered for transmission of data. Each of the plurality of control units comprises a first receiver for receiving both of the digital data signals having oppositive polarities and outputting a first difference signal indicative of a difference between the digital data signals, a second receiver for receiving one of the digital data signals and outputting a second difference signal indicative of a difference between the one of the digital data signals and a predetermined reference level set thereto, and a third receiver for receiving the other of the digital data signals and outputting a third difference signal indicative of a difference between the other of the digital data signals and a predetermined reference level set thereto. Detecting of which of the pair of signal lines is faulty, is carried out based on the first difference signal output from the first receiver, the second difference signal output from the second receiver, and the third difference signal output from the third receiver.

4 Claims, 7 Drawing Sheets

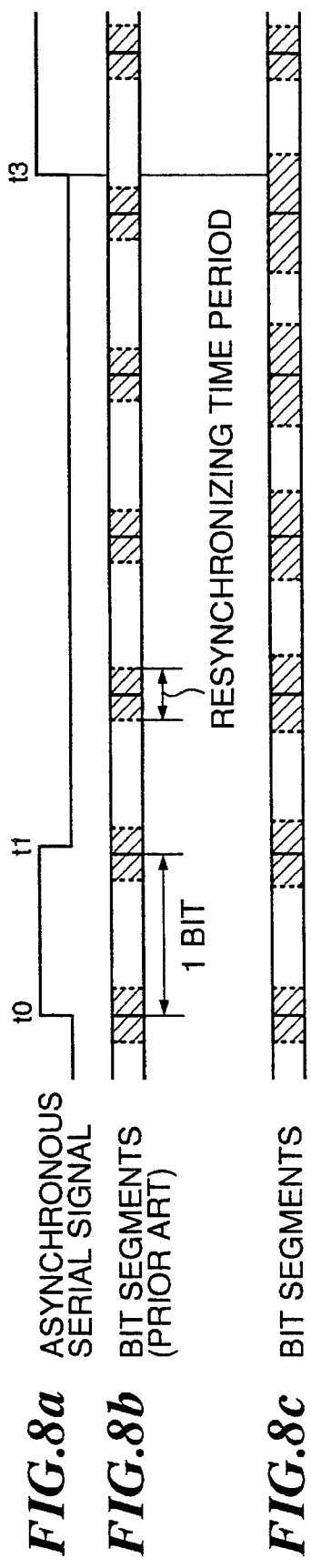

DATA TRANSMISSION SYSTEM FOR AUTOMOTIVE VEHICLES

BACKGROUND OF THE INVENTION

1. Field of the Invention

This invention relates to a data transmission system for an automotive vehicle, which comprises a plurality of electronic control units installed on the vehicle and a common communication line connecting the electronic control units with each other.

2. Prior Art

Recently, automotive vehicles are electronically controlled in respect of most part of the engine control, the suspension control, and so on. Accordingly, they are each equipped with a data transmission system for connecting a plurality of electronic control units (hereinafter referred to as "the ECU's") for the respective types of control by a common communication line (hereinafter referred to as "the network bus") to transmit data necessary for the above types of control to each other by the use of asynchronous serial data signals.

High reliability is demanded of this type of data transmission system for automotive vehicles, and therefore, the system employs a twisted-pair transmission method in which the network bus is implemented by a composite signal line formed by a twisted-pair transmission line having a pair of signal lines to which a sending end (ECU) delivers digital data signals having opposite polarities (i.e. being opposite in phase), respectively, so that a receiving end (ECU) can receive a message from the sending end based on changes in the polarities of the signals indicative of the logical states of the signals. The twisted-pair transmission method makes it possible to transmit data even if one of the pair of signal lines is disconnected, thereby enhancing reliability of the system.

However, the twisted-pair transmission method is capable of transmitting data even if one of the twisted pair is disconnected, for example, as described above. Therefore, it is neither possible to recognize occurrence of the fault nor to determine which of them is faulty due to disconnection, ground fault, or the like, which prevents the system from recovering from the fault. Therefore, when the other of the twisted-pair, which has been safe, becomes faulty, it is entirely impossible for the system to perform data transmission.

Further, within such a conventional data transmission system, a receiving end (ECU) is required to perform synchronization of bit times by making the phase of a bit time of a serial data signal received from the network bus and the phase of a bit time within the receiving end synchronous with each other, as well as to perform resynchronization by temporarily lengthen or shorten the bit time within the receiving end to correct a difference in phase of the bit time within the receiving end from the bit time of the received serial data signal with which the bit time within the receiving end was already made synchronous, so as to always ensure correct demodulation of the serial data signal.

Conventionally, as shown in FIG. 8a and FIG. 8b, the resynchronization is permitted only when the logical state of the serial data signal has changed within each synchronizing time period (see FIG. 8b at a time point t1), to prevent the system from being susceptible to noises.

However, there is usually a slight difference between the reference clock frequency of a sending end (ECU) and that of a receiving end (ECU), so that when the serial data signal continues to be in the same logical state, the difference can be accumulated to such an extent as will cause a point of change in the logical state of the serial data signal to fall outside a corresponding resynchronizing time period (see FIG. 8b at a time point t3), causing the bit time of the receiving end to be out of phase.

If each synchronizing time period is set to a longer duration for prevention of such a problem, there now arises an inconvenience of a higher possibility of erroneous resynchronization caused by noises or the like.

SUMMARY OF THE INVENTION

It is a first object of the invention to provide a data transmission system for an automatic vehicle for transmitting data between a plurality of electronic control units via a transmission line formed by a pair of signal lines, by a sending end delivering digital data signals having opposite polarities to the respective signal lines, which is capable of detecting a fault occurring to one of the pair of signal lines and determining which of them is faulty.

It is a second object of the invention to provide a data transmission system which is capable of performing accurate resynchronization of the bit times even when the serial data signal continues to be in the same logical state.

To attain the first object, the present invention provides a data transmission system for an automotive vehicle, including a plurality of control units installed on the vehicle, and a transmission line connecting the plurality of control units with each other and comprising a pair of signal lines to which digital data signals having opposite polarities are delivered for transmission of data.

The data transmission system according to the invention is characterized in that each of the plurality of control units comprises:

first receiving means for receiving both of the digital data signals having oppositive polarities and for outputting a first difference signal indicative of a difference between the digital data signals;

second receiving means for receiving one of the digital data signals and for outputting a second difference signal indicative of a difference between the one of the digital data signals and a predetermined reference level set thereto;

third receiving means for receiving the other of the digital data signals and for outputting a third difference signal indicative of a difference between the other of the digital data signals and a predetermined reference level set thereto; and fault-detecting means for detecting which of the pair of signal lines is faulty, based on the first difference signal output from the first receiving means, the second difference signal output from the second receiving means, and the third difference signal output from the third receiving means.

Preferably, the fault-detecting means comprises a first exclusive OR circuit for outputting a first detection signal indicative of an exclusive OR of the first difference signal output from the first receiving means and the second difference signal output from the second receiving means, and a second exclusive OR circuit for outputting a second detection signal indicative of an exclusive OR of the first difference signal output from the first receiving means and the third difference signal output from the third receiving means, and wherein the fault-detecting means detects which of the pair of signal lines is faulty, based on the first detection signal output from the first exclusive OR circuit and the second detection signal output from the second exclusive OR circuit.

More preferably, the fault-detecting means detects which of the pair of signal lines is faulty, in the vicinity of a center of each bit time of the digital data signals.

Further preferably, the fault-detecting means includes a timing clock pulse generator for generating predetermined timing clock pulses in the vicinity of the center of each bit time of the digital data signals, a first sampling circuit for being supplied with the first detection signal from the first exclusive OR circuit and the predetermined timing clock pulses from the timing clock pulse generator, for sampling of the first detection signal in response to the predetermined timing clock pulses, and a second sampling circuit for being supplied with the second detection signal from the second exclusive OR circuit and the predetermined timing clock pulses from the timing clock pulse generator, for sampling of the second detection signal in response to the predetermined timing clock pulses.

The above and other objects, features, and advantages of the invention will become more apparent from the following detailed description taken in conjunction with the accompanying drawings.

BRIEF DESCRIPTION OF THE DRAWINGS

FIG. 4a to FIG. 4i form a timing chart which is useful in explaining the operation of the data transmission system for detecting a fault of the network bus, when the speeds of response of receivers are identical to each other, in which:

FIG. 4a shows a signal applied to a sending terminal T2 appearing in FIG. 3;

FIG. 4b shows a signal applied to a sending terminal T1 appearing in FIG. 3;

FIG. 4d shows a signal appearing on one signal line A of a twisted-pair transmission line appearing in FIG. 3;

FIG. 4d shows a signal appearing on the other signal line B of the twisted-pair transmission line appearing in FIG. 3;

FIG. 4e shows an output signal RX-D from a differential receiver 111 appearing in FIG. 3;

FIG. 4f shows an output signal RX-1 from an A receiver 121 appearing in FIG. 3;

FIG. 4g shows an output signal RX-2 from a B receiver 126 appearing in FIG. 3;

FIG. 4h shows an input signal to an A fault-detecting terminal T4 appearing in FIG. 3; and FIG. 4i shows an input signal to a B fault-detecting terminal T5 appearing in FIG. 3;

FIG. 5a to FIG. 5i form a timing chart which is useful in explaining the operation of the data transmission system for detecting a fault of the network bus, when the speeds of response of the receivers are different from each other, in which:

FIG. 5a shows the signal applied to the sending terminal T2;

FIG. 5b shows the output signal RX-D from the differential receiver 111;

FIG. 5c shows the output signal RX-1 from the A receiver 121;

FIG. 5d shows the output signal RX-2 from the B receiver 126;

FIG. 5e shows an output from an A exclusive "OR" circuit 131 appearing in FIG. 3; and FIG. 5f shows an output from a B exclusive "OR" circuit 133 appearing in FIG. 3;

FIG. 5g shows the timing of sampling clock pulses;

FIG. 5h shows the input signal to the A fault-detecting terminal T4; and

FIG. 5i shows the input signal to the B fault-detecting terminal T5;

FIG. 6a to FIG. 6c form a timing chart which is useful in explaining the construction of one bit time, in which:

FIG. 6a shows timing clock pulses;

FIG. 6b shows an asynchronous serial signal; and

FIG. 6c shows bit segments of bits in a receiving end;

FIG. 8a to FIG. 8c form a timing chart which is useful in explaining a manner of setting a resynchronizing time period, in which:

FIG. 8a shows the asynchronous serial signal;

FIG. 8b shows bit segments of bits in the receiving end according to the prior art; and FIG. 8c shows bit segments of bits in a receiving end according to the embodiment of the invention.

DETAILED DESCRIPTION

The invention will be described in detail with reference to drawings showing an embodiment of the invention.

Figure 1:
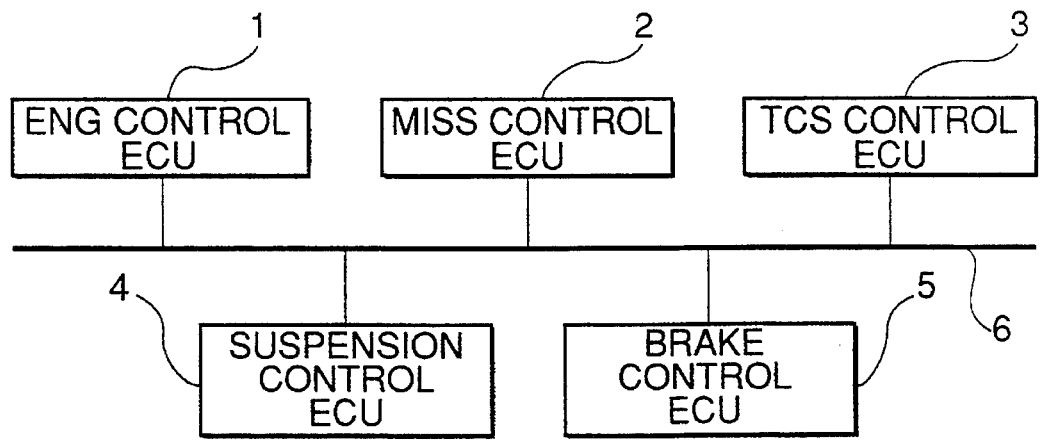
FIG. 1 is a block diagram showing the whole arrangement of a data transmission system for an automotive vehicle, according to an embodiment of the invention.

FIG. 1 schematically shows the arrangement of a data transmission system for an automotive vehicle according to the embodiment. The data transmission system comprises electronic control units (hereinafter referred to as "the ECU's") 1 to 5 connected with each other via a network bus 6. An ENG control ECU 1 controls operation of an engine in response to operation of an accelerator pedal operated by a driver of the vehicle, etc. An MISS control ECU 2 controls an automatic transmission of the vehicle depending on the operating conditions of the engine. A TCS control ECU 3 detects a slip of driving wheels and controls an output torque of the engine. A suspension control ECU 4 controls a suspension (active suspension) system of the vehicle depending on the operating conditions of the engine. A brake control ECU 5 detects a slip of wheels and controls braking operation. These ECU's 1 to 5 are required to be permitted to mutually monitor control parameters determined by the ECU's and operating parameters detected by sensors, some of the sensors being collectively shown in FIG. 2, and hence are connected to each other by the network bus 6 for transmission of data necessitated by each other.

Figure 2:
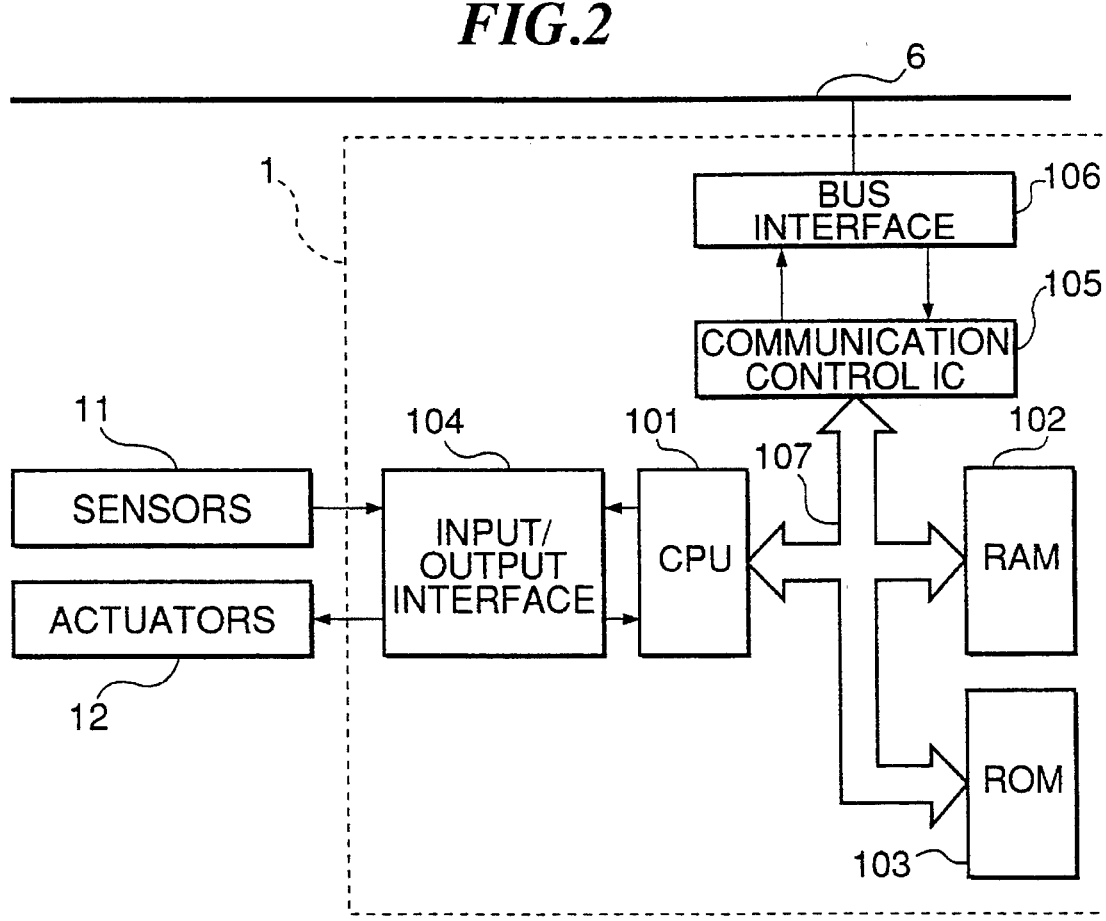
FIG. 2 is a block diagram showing the arrangement of one of electronic control units appearing in FIG. 1.

FIG. 2 shows the arrangement of the ENG control ECU 1 which comprises a central processing unit (hereinafter referred to as "the CPU") 101, an input/output interface 104 by way of which a plurality of sensors 11, and a plurality of actuators, such as fuel injection valves, are connected to the CPU 101. The CPU 101 is connected via a bus line 107 to a RAM (Random Access Memory) 102, a ROM (Read Only Memory) 103, and a communication control IC (Integrated Circuit) 105. The communication control IC 105 is connected via a bus interface 106 to the network bus 6.

The CPU 101 determines control parameters based on output signals from the sensors 11 according to programs stored in the ROM 103 to drive the actuators 12. The RAM 102 temporarily stores data of results of computation therein. The communication control IC 105 controls transmission of a message to the network bus and reception of a message from the network bus.

Figure 3:
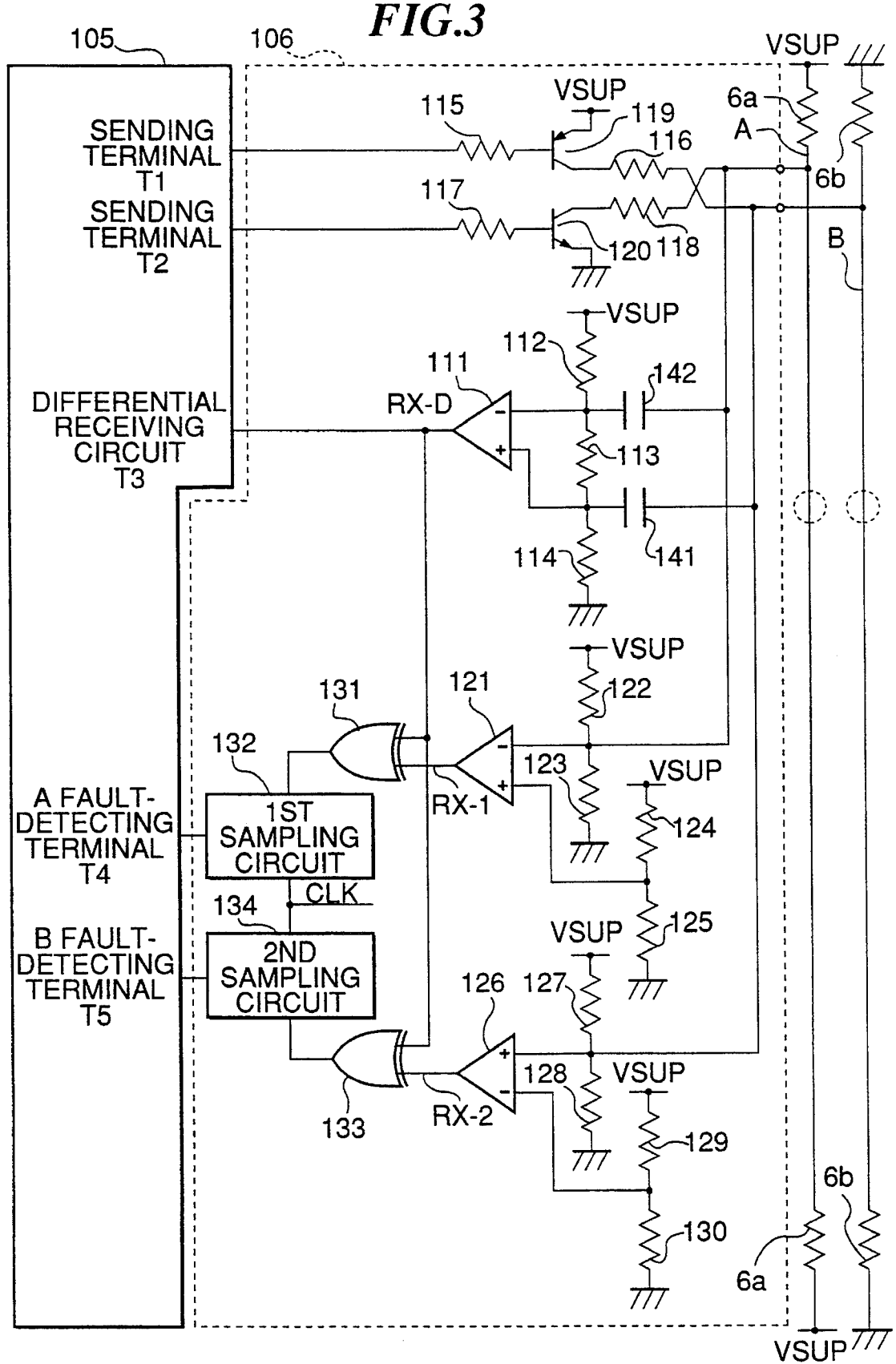
FIG. 3 is a circuit diagram showing details of a bus interface and a network bus both appearing in FIG. 2.

FIG. 3 shows details of the network bus 6 and the bus interface 106 connected to the communication control IC 105. The network bus 6 is formed by a twisted-pair transmission line comprised of a signal line A being connected to a power supply line VSUP to have its potential pulled up and having terminating resistances 6a, and a signal line B having its potential not pulled up, and having terminating resistances 6b.

The communication control IC 105 has a first sending terminal T1 connected to a base of a transistor 119 via a resistance 115. The transistor 119 has an emitter thereof connected to the power supply line VSUP, and a collector thereof connected to a non-inverting input terminal of a first comparator (hereinafter referred to as "the differential receiver") 111 via a capacitor 141 for extracting an amount of change in amplitude of the signal on the signal line B, a non-inverting input terminal of a second comparator (hereinafter referred to as "the B receiver") 126, and the signal line B of the twisted-pair transmission line, by way of a resistance 116.

The communication control IC 105 has a second sending terminal T2 connected to a base of a transistor 120 via a resistance 117. The transistor 120 has an emitter thereof grounded, and a collector thereof connected to an inverting input terminal of the differential receiver 111 via a capacitor 142 for extracting an amount of change in amplitude of the signal on the signal line A, an inverting input terminal of a third comparator (hereinafter referred to as "the A receiver") 121, and the signal line A of the twisted-pair transmission line, by way of a resistance 118.

The inverting input terminal of the differential receiver 111 is connected via a resistance 112 to the power supply line VSUP, and also via a resistance 113 to the non-inverting input terminal of the differential receiver 111. The differential receiver 111 has its non-inverting input terminal grounded via a resistance 114, and delivers an output signal RX-D therefrom to a differential receiving terminal 13 of the communication control IC 105.

The inverting input terminal and the non-inverting input terminal of the A receiver 121 are connected to a voltage divider formed by resistances 122 and 123 for dividing voltage of the power supply line VSUP, and a voltage divider formed by resistances 124 and 125 for dividing same, respectively. The A receiver 121 compares voltage (corresponding to the logical state) of a signal on the signal line A of the twisted-pair transmission line applied to the inverting input terminal thereof with a reference voltage determined by the resistances 124 and 125 of the voltage divider and applied to the non-inverting input terminal thereof, and delivers a difference signal RX-1 indicative of a difference (i.e. results of the comparison) therebetween to one input terminal of a first exclusive "OR" gate (hereinafter referred to the A exclusive "OR" circuit) 131.

The A exclusive "OR" circuit 131 has the other input terminal thereof supplied with the output signal RX-D from the differential receiver 111, and delivers an output signal (detection signal) to a first sampling circuit 132 which samples the output signal from the A exclusive "OR" circuit 131, bit by bit, based on predetermined sampling clock pulses CLK supplied from a sampling clock pulse generator, not shown. The first sampling circuit 132 delivers its output signal to an A fault-detecting terminal T4 of the communication control IC 105.

The non-inverting input terminal and the inverting input terminal of the B receiver 126 are connected to a voltage divider formed by resistances 127 and 128 for dividing voltage of the power supply line VSUP, and a voltage divider formed by resistances 129 and 130 for dividing same, respectively. The B receiver 126 compares voltage (corresponding to the logical state) of a signal on the signal line B of the twisted-pair transmission line applied to the non-inverting input terminal thereof with a reference voltage determined by the resistances 129 and 130 and applied to the inverting input terminal thereof, and delivers a difference signal RX-2 indicative of a difference (i.e. results of the comparison) therebetween to one input terminal of a second exclusive "OR" gate (hereinafter referred to the B exclusive "OR" circuit) 133.

The B exclusive "OR" circuit 133 has the other input terminal thereof supplied with the output signal RX-D from the differential receiver 111, and delivers an output signal (detection signal) to a second sampling circuit 134 which samples the output signal from the B exclusive "OR" circuit 133, bit by bit, based on the predetermined sampling clock pulses CLK. The second sampling clock 133 delivers its output signal to a B fault-detecting terminal T5 of the communication control IC 105.

The first and second sending terminals T1, T2 of the communication control IC 105 are supplied with pulse signals opposite to each other in phase. When the first sending terminal T1 is at a low level (the logical state "0") and the second sending terminal T2 is at a high level (the logical state "1"), both the transistors 119 and 120 are turned on to set the logical state of the signal on the signal line B of the twisted-pair transmission line to "1" and the logical state of the signal on the signal line A of the twisted-pair transmission line to "0". When the first sending terminal T1 is at a high level and the second sending terminal T2 is at a low level, both the transistors 119 and 120 are turned off to set the logical state of the signal on the signal line B to "0" and the logical state of the signal on the signal line A to "1". Thus, a sending end (e.g. ENG ECU) sends out signals opposite in phase to each other, to the signal lines A and B of the twisted-pair transmission line forming the network bus, respectively.

As can be presumed from the above, the logical state of the output signal RX-D from the differential receiver 111 becomes equal to "0" or "1", as the logical state of the signal on the signal line A of the twisted-pair transmission line becomes equal to "1" or "0" (i.e. as the logical state of the signal on the signal line B becomes equal to "0" or "1"), whereby a message loaded on the network bus 6 is received.

The ECU's 2 to 5 are basically constructed in the same manner. Therefore, even if one of the ECU's sends out a signal which sets the logical state of the signal on signal line B to "0" (i.e. sets the logical state of the signal line A to "1"), when another ECU sends out a signal which sets the logical state of the signal line B to "1", the logical state of the signal on the signal line B is set to "1". Therefore, in the present embodiment, a state in which the signal on the signal line B is at the high level (i.e. the logical state thereof is equal to "1") and hence the signal on the signal line A is at the low level (i.e. the logical state thereof is equal to "0") is defined as a dominant state, and an opposite state thereof as a recessive state.

Next, the operation of the present system for detecting a fault, such as a disconnection or a short-circuit, of the network bus 6 will be described with reference to a timing chart shown in FIG. 4a to FIG. 4i and one shown in FIG. 5a to FIG. 5i. FIG. 4a to FIG. 4i correspond to an ideal case in which the speed of response of the differential receiver 111 is equal to that of the A receiver 121 and that of the B receiver 126, whereas FIG. 5a to FIG. 5i correspond to a case in which the speed of response of the differential receiver 111 is different from that of the A receiver 121 and that of the B receiver 126.

Figure 4:
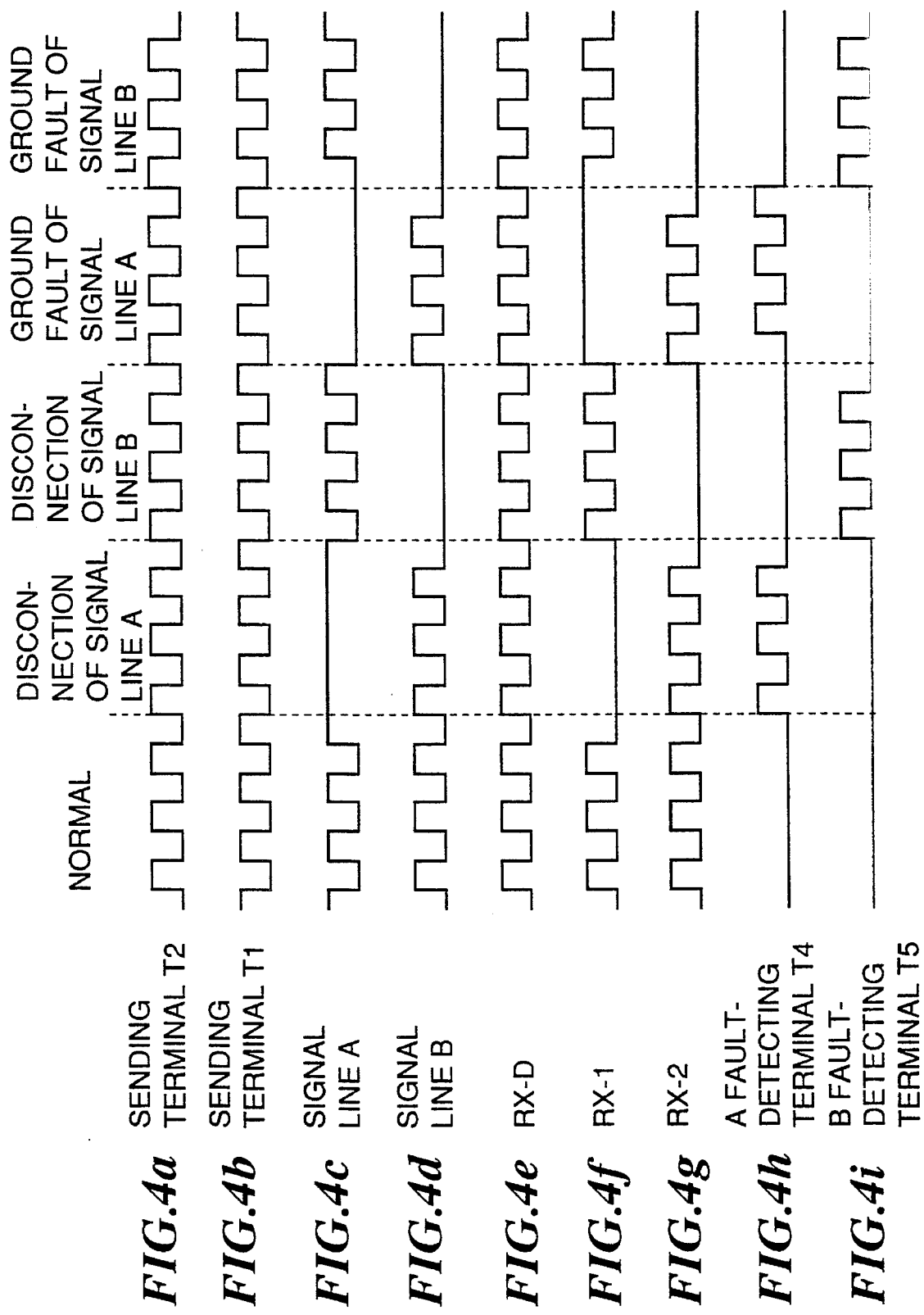

Referring to the timing chart of FIG. 4a to FIG. 4i, when the sending terminals T1 and T2 are supplied with transmitter signals having polarities opposite to each other, as shown in FIG. 4b and FIG. 4a, respectively, signals having polarities opposite to those of the sending terminals T1 and T2, respectively, as shown in FIG. 4d and FIG. 4c, appear on the signal lines B and A of the twisted-pair transmission line through operations of the transistors 119 and 120, provided that the network bus 6 is not faulty.

However, if the pulled-up signal line A of the twisted-pair transmission line suffers from a disconnection or a ground fault at a point indicated by a circle of the broken line in FIG. 3, for example, the signal on the signal line A of the twisted-pair transmission line is held at the logical state "1" or "0" irrespective of the logical states of the transmitter signals (see FIG. 4c), and the signal on the signal line B of the twisted-pair transmission signal is opposite in polarity to the transmitter signal applied to the sending terminal T1 (see FIG. 4d).

In contrast, if the non-pulled-up signal line B of the twisted-pair transmission line suffers from a disconnection or a ground fault at a point indicated by a circle of the broken line in FIG. 3, for example, the signal on the signal line B of the twisted-pair transmission line is held at the logical state "0" irrespective of the logical states of the transmitter signals (see FIG. 4d), and the signal on the signal line A of the twisted-pair transmission line is opposite in polarity to the transmitter signal on the sending terminal T2 (see FIG. 4c).

On the other hand, the output signal RX-D from the differential receiver 111 always has the same polarity as the transmitter signal applied to the sending terminal T2, as shown in FIG. 4e, irrespective of whether the signal line A or B of the twisted-pair transmission line suffers from a disconnection or a ground fault. That is, even if one of the signal line A or B of the twisted-pair transmission line suffers from a disconnection or a ground fault, it is possible for other ECU's to normally receive the message sent out from the present ECU.

If the signal line A suffers from a disconnection or a ground fault at the point indicated by the circle of the broken line as shown in FIG. 3f for example, the signal on the signal line A connected to the inverting input terminal of the A receiver 121 is held high or low (i.e. the logical state thereof is equal to "1" or "0"), and the output signal RX-1 from the A receiver 121 is held low or high (i.e. the logical state thereof is equal to "0" or "1") (see FIG. 4f), accordingly.

Further, if the signal line B suffers from the disconnection or ground fault at the point indicated by the circle of the broken line as shown in FIG. 3, for example, the signal on the signal line B applied to the B receiver 126 is held low (i.e. the logical state thereof is equal to "0"), so that the output signal RX-2 from the B receiver 126 is held low (i.e. it is in the logical state "0") (see FIG. 4g).

The A exclusive "OR" circuit 131 delivers a signal indicative of the exclusive "OR" of the output signal RX-1 from the A receiver 121 and the output signal RX-D from the differential receiver 111, which goes high (i.e. enters the logical state "1") only when the signal line A suffers from a disconnection or a ground fault, as shown in FIG. 4h, via the first sampling circuit 132 to the A fault-detecting terminal T4. Therefore, the communication control IC 105 can recognize that the signal line A of the twisted pair transmission line is faulty, when the signal applied to the A fault-detecting terminal T4 goes high (i.e. enters the logical state "1").

On the other hand, the B exclusive "OR? circuit 133 delivers a signal indicative of the exclusive "OR" of the output signal RX-2 from the B receiver 126 and the output signal RX-D from the differential receiver 111, which goes high (i.e. enters the logical state "1") only when the signal line B suffers from a disconnection or a ground fault, as shown in FIG. 4i, via the second sampling circuit 134 to the B fault-detecting terminal T5. Therefore, the communication control IC 105 can recognize that the signal line B of the twisted pair transmission line is faulty, when the signal applied to the B fault-detecting terminal T5 goes high (i.e. enters the logical state "1").

In this manner, the communication control IC 105 is capable of determining which of the signal lines A and B of the twisted-pair transmission line is faulty.

However, if the speed of response of the differential receiver 111 is different from the speed of response of the A receiver 121 or that of the B receiver 126, resulting in a difference in timing of generation of the output signals RX-D, RX-1, and RX-2, as shown in FIG. 5b, FIG. 5c, and FIG. 5d, the A exclusive "OR" circuit 131 and the B exclusive "OR" circuit 133 generates pulses at points of change in the logic of the signal bits, as shown in FIG. 5e or FIG. 5f, which can cause the communication control IC 105 to erroneously determine that the twisted-pair transmission line is faulty.

Therefore, in the present embodiment, pulses of the sampling clock CLK, which are generated at or in the vicinity of the center of each bit time, are supplied to the first and second sampling circuits 132 and 134, as shown in FIG. 5g, which sample the output signals from the A exclusive "OR" circuit 131 and the B exclusive "OR" circuit 133, respectively, in response to the predetermined timing clock pulses CLK to avoid generating the erroneous pulses described above.

Figure 5:
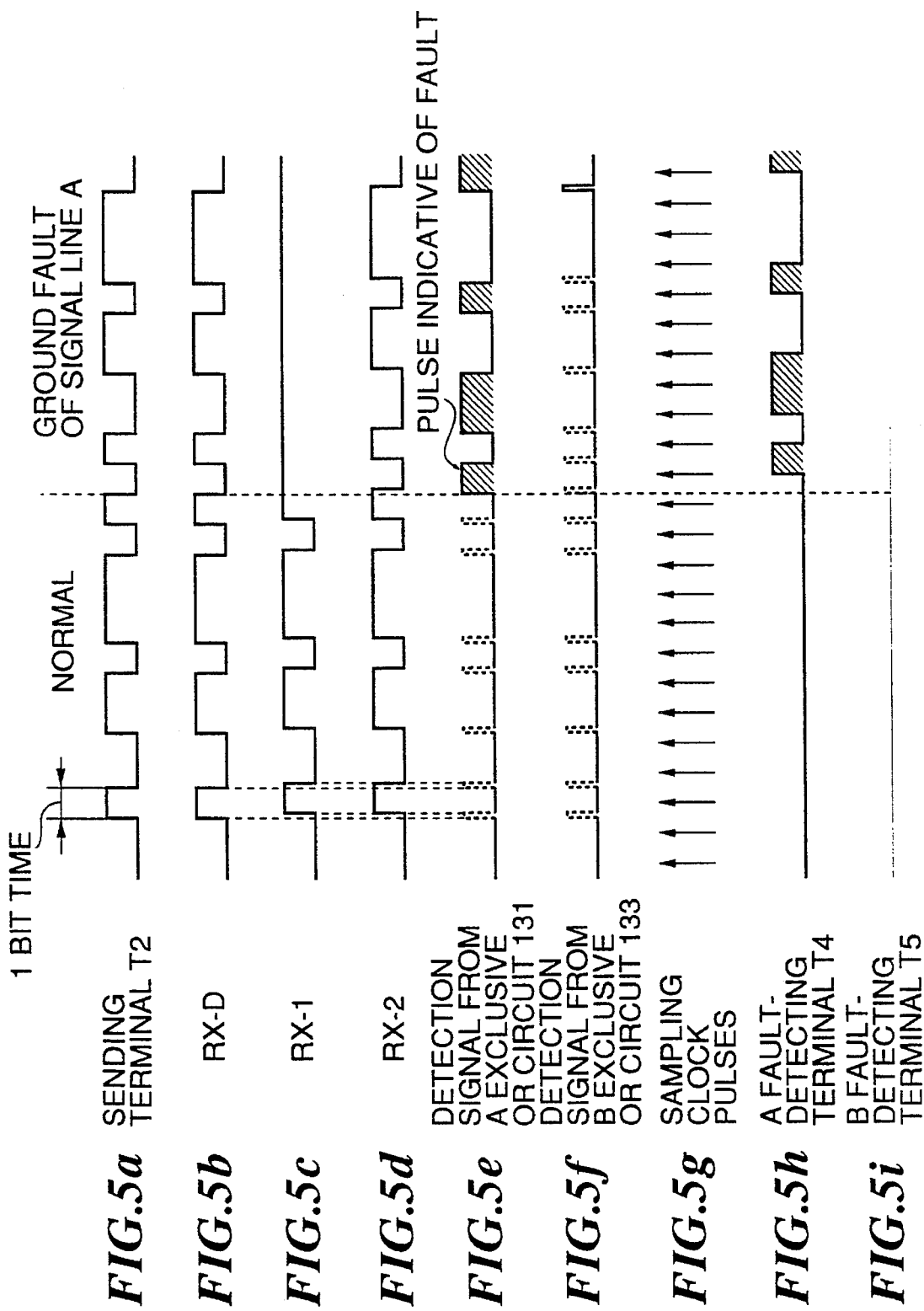

Thus, the first and second sampling circuits 132 and 134 perform sampling of only the output signals from the A exclusive "OR" circuit 131 and the B exclusive "OR" circuit 133, bit by bit, which correctly indicate a fault of the twisted-pair transmission line, if any, and deliver output signals to the A fault-detecting terminal T4 and the B fault-detecting terminal T5, as shown in FIG. 5h and FIG. 5i, thereby preventing occurrences of the erroneous detection of a fault in the twisted-pair transmission line. In this connection, although FIG. 5 shows a case in which the signal line A of the twisted-pair transmission line suffers from a ground fault, it goes without saying that erroneous detection of a disconnection of the signal line A, or a disconnection or a ground fault of the signal line B, can be prevented, in the same manner.

Next, a method of data transmission between the ECU's will be described. In the present embodiment, a token passing method is employed. This takes into consideration the fact that compared with a CSMA/CD (Carrier Sense Multiple Access with Collision Detection) method which is capable of settling the collision, the token passing method is advantageous in respect of an electric delay on the network bus, and is capable of easily determining the maximum message delay time period, allowing the network system to be designed easily.

The construction of each bit corresponding to one bit time used in the present embodiment will be described with reference to FIG. 6a to FIG. 6c.

Figure 6:
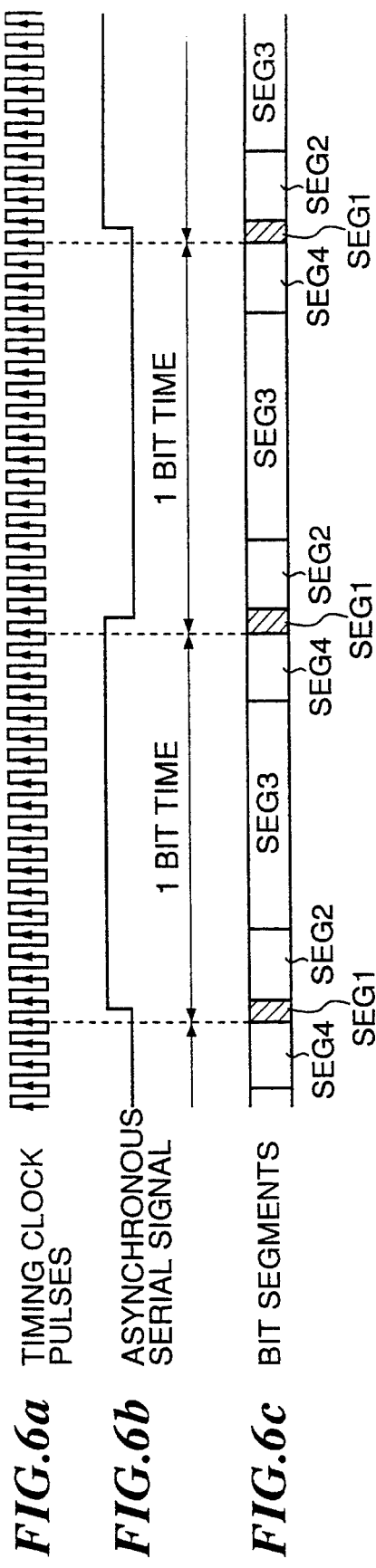

FIG. 6a shows reference timing clock pulses, and FIG. 6b shows an asynchronous serial signal received. As shown in FIG. 6c, in the present embodiment, one bit is divided into four segments SEG1 to SEG4.

The segment SEG1 corresponds to a section within which an edge (a point of change in the logic) of the serial signal should occur, the segment SEG2 to a first section for synchronization or resynchronization, the segment SEG3 to a section for sampling, and the segment SEG4 to a second section for resynchronization. The segment SEG1 has a duration of one clock time (a repetition period of the timing clock pulse), and the segments SEG2 to SEG4 have respective durations longer than one clock time. Therefore, the segments SEG4, SEG1 and SEG2 determine a time period for resynchronization (resynchronizing time period).

Figure 7:
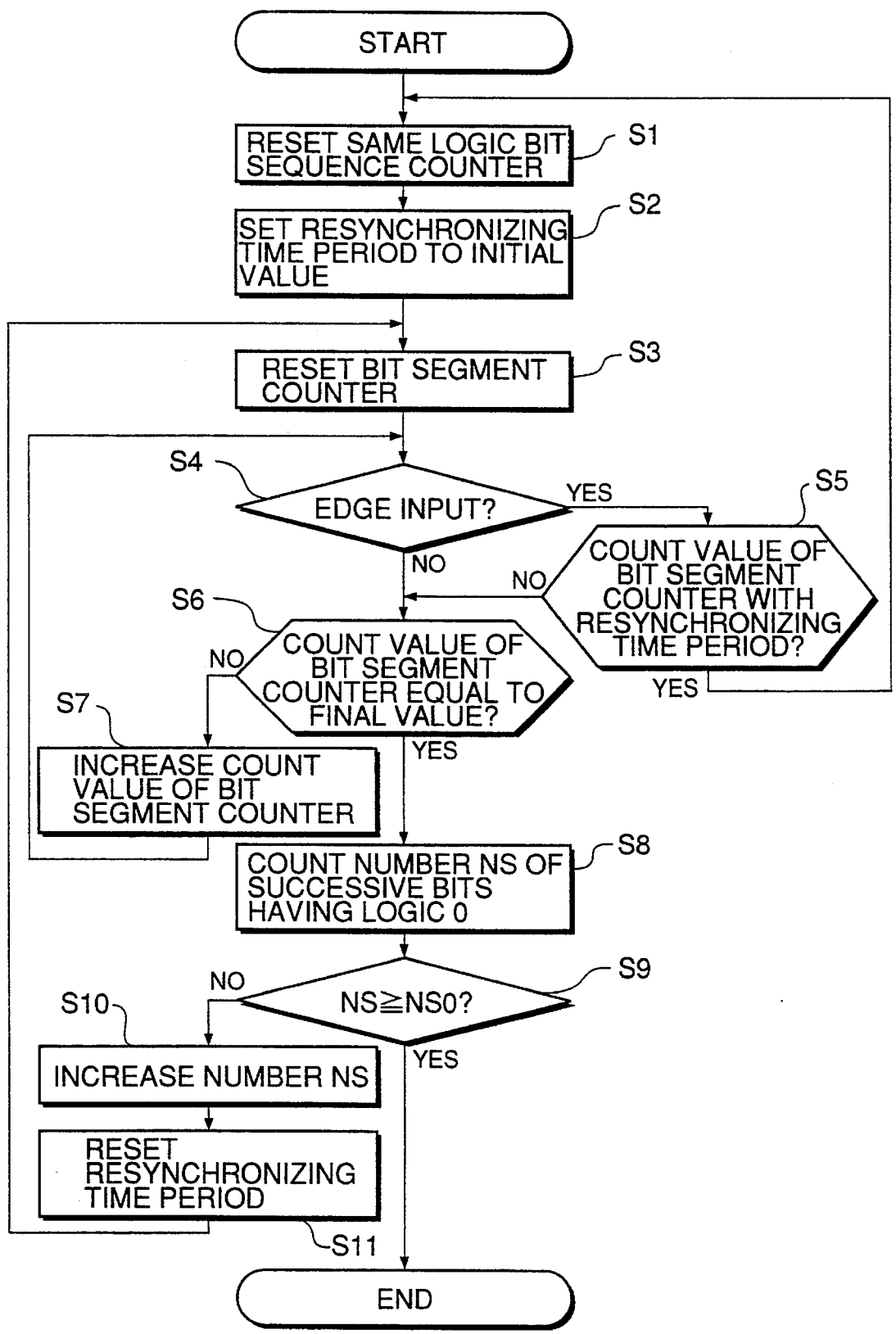
FIG. 7 is a flowchart showing a procedure of synchronizing/resynchronizing processing according to the embodiment.

FIG. 7 shows a program for performing the synchronizing/resynchronizing processing executed according to the present embodiment. This processing is started upon starting reception of a message (more specifically, when one dominant bit indicative of the start of a message is detected).

First, at a step S1, a same logic bit sequence counter, not shown, for counting the number of sequential or successive bits having the same logic is reset, and then the resynchronizing time period is set to an initial value at a step S2, followed by resetting a bit segment counter, not shown, for counting the number of timing clock pulses corresponding to one bit time at a step S3. Upon resetting of the bit segment counter, the synchronization is effected (see FIG. 8a and FIG. 8c). At the following step S4, it is determined whether or not an edge of the serial signal has been input or detected.

When the step S4 is first carried out, the edge cannot be input, and hence the program proceeds to a step S6, where it is determined whether or not the count value of the bit segment counter is equal to a final value. In this connection, the final value of the bit segment counter means a count value corresponding to the lapse of one bit time. When this step is first carried out, the answer to this question is negative (NO), and the bit segment counter is increased by an incremental value at a step S7, followed by the program returning to the step S4. If an edge of the serial signal is input or detected (see FIG. 8c at a time point t1 designated by FIG. 8a), during execution of cycles of the steps S4, S6, and S7, the program proceeds from the step S4 to a step S5, where it is determined whether or not the count value of the bit segment counter is within a corresponding resynchronizing time period (corresponding to a total duration of the segment 4, the segment 1, and the segment 2). If the answer to this question is affirmative (YES), the program returns via the steps S1 and S2 to the step S3, where the bit segment counter is reset to perform resynchronization. If the answer is negative (NO), the program returns to the step S6.

If the answer to the question of the step S6 becomes affirmative (YES), during execution of cycles of the steps S4, S6, and S7, i.e. if the count value of the bit segment counter has reached the final value, the program proceeds to a step S8, where a NS counter, not shown, counts the number NS of successive bits having the logic 0, and then it is determined at a step S9 whether or not the counter value NS of the NS counter is equal to or larger than a predetermined value NS0. If the answer to this question is affirmative (YES), it is judged that the end of the message has been reached, followed by terminating the present processing.

If NS<NS0, the same logic bit sequence counter is increased by an incremental value at a step S10, and then the resynchronizing time period is updated depending on the count value of the same logic bit sequence counter at a step S11, followed by the program returning to the step S3.

The resynchronizing time period is set e.g. such that it becomes wider as in proportion to the count value of the same logic sequence counter. The setting of the resynchronizing time period is effected by increasing the duration of the segment SEG2 and that of the segment SEG4 while holding the duration of the segment SEG1 to one clock time. As a result, as shown in FIG. 1c, the resynchronizing time period is set to a progressively-lengthened one from the time point t1 on, so that a point of change of the logic of the input signal occurring at a time point t3 can fall within the updated resynchronizing time period to permit the resynchronization. Thus, even when the serial signal continues to have the same logic, it is possible to receive the serial signal accurately without suffering from a problem of the bit time within the receiving end (ECU) going out of phase as was the case with the prior art shown in FIG. 8b.

Further, when the change of the logic frequently occurs, the resynchronizing time period is substantially held at the initial value (set at the step S2 of the FIG. 7 program), which makes it possible to suppress the possibility of the bit time within the receiving end going out of phase due to noises.

In addition, the method of setting the resynchronizing time period is not restricted to one described above, but there may be employed a method of holding the resynchronizing time period at an initial value until the count value of the same logic bit sequence counter becomes equal to 3, and lengthening the resynchronizing time period in proportion to the count value of the same logic bit sequence counter when it becomes equal to or larger than 4.

Further, the above method of setting the resynchronizing time period is not restrictively applied to the token passing method, but it may be also applied to the CSMA/CD method.

What is claimed is:

1. In a data transmission system for an automotive vehicle, including a plurality of control units installed on said vehicle, and a transmission line connecting said plurality of control units with each other, said transmission line comprising a pair of signal lines to which digital data signals having opposite polarities are delivered for transmission of data, the improvement wherein each of said plurality of control units comprises:

first receiving means for receiving both of said digital data signals having oppositive polarities, and for outputting a first difference signal indicative of a difference between said digital data signals;

second receiving means for receiving one of said digital data signals, and for outputting a second difference signal indicative of a difference between said one of said digital data signals and a predetermined reference level set thereto;

third receiving means for receiving the other of said digital data signals, and for outputting a third difference signal indicative of a difference between the other of said digital data signals and a predetermined reference level set thereto; and fault-detecting means for detecting which of said pair of signal lines is faulty, based on said first difference signal output from said first receiving means, said second difference signal output from said second receiving means, and said third difference signal output from said third receiving means.

2. A data transmission system according to claim 1, wherein said fault-detecting means comprises a first exclusive OR circuit for outputting a first detection signal indicative of an exclusive OR of said first difference signal output from said first receiving means and said second difference signal output from said second receiving means, and a second exclusive OR circuit for outputting a second detection signal indicative of an exclusive OR of said first difference signal output from said first receiving means and said third difference signal output from said third receiving means, and wherein said fault-detecting means detects which of said pair of signal lines is faulty, based on said first detection signal output from said first exclusive OR circuit and said second detection signal output from said second exclusive OR circuit.

3. A data transmission system according to claim 2, wherein said fault-detecting means detects which of said pair of signal lines is faulty, by sampling said detection signals at a timing in the vicinity of a center of each bit time of said digital data signals.

4. A data transmission system according to claim 3, wherein said fault-detecting means includes a timing clock pulse generator for generating predetermined timing clock pulses in the vicinity of said center of each bit time of said digital data signals, a first sampling circuit for being supplied with said first detection signal from said first exclusive OR circuit and said predetermined timing clock pulses from said timing clock pulse generator, for sampling of said first detection signal in response to said predetermined timing clock pulses, and a second sampling circuit for being supplied with said second detection signal from said second exclusive OR circuit and said predetermined timing clock pulses from said timing clock pulse generator, for sampling of said second detection signal in response to said predetermined timing clock pulses.

\* \* \* \* \*